United States Patent [19]

Wang et al.

[11] Patent Number: 5,383,819
[45] Date of Patent: Jan. 24, 1995

[54] DAMPING DEVICE FOR GYMNASTIC APPARATUS

[75] Inventors: Leao Wang; Peter Wu, both of Taichung Hsien, Taiwan, Prov. of China

[73] Assignee: Greenmaster Industrial Corp., Taiping Hsiang, Taiwan, Prov. of China

[21] Appl. No.: 205,156

[22] Filed: Mar. 3, 1994

Related U.S. Application Data

[63] Continuation-in-part of Ser. No. 96,998, Jul. 26, 1993, Pat. No. 5,322,481.

[51] Int. Cl.⁶ ............................................... F16H 7/00
[52] U.S. Cl. .......................................... 474/144; 482/64
[58] Field of Search ............... 474/144, 140, 111, 101, 474/148, 69; 482/57, 64, 65

[56] References Cited

U.S. PATENT DOCUMENTS

| | | | |
|---|---|---|---|
| 4,917,377 | 4/1990 | Chen | 482/64 |
| 5,267,925 | 12/1993 | Boyd | 482/64 |
| 5,286,234 | 2/1994 | Young | 474/111 |
| 5,322,481 | 6/1994 | Wang | 482/64 X |

*Primary Examiner*—Michael Powell Buiz
*Attorney, Agent, or Firm*—Bacon & Thomas

[57] ABSTRACT

A damping device includes a curved channel plate having a bottom end pivotally disposed around the peripheral flange of the flywheel of a rotary gymnastic apparatus and linked to a spring-supported hook at one end of a rotary knob-controlled traction device, two friction pads bilaterally fastened inside the curved channel plate and controlled by the traction device to touch the peripheral flange of the flywheel in giving a damping force to the flywheel.

1 Claim, 3 Drawing Sheets

DAMPING DEVICE FOR GYMNASTIC APPARATUS

BACKGROUND OF THE INVENTION

The present invention is a continuation-in-part of U.S. patent application Ser. No. 08/096,998, filed Jul. 26, 1993 now U.S. Pat. No. 5,322,481.

The damping device disclosed in U.S. patent application Ser. No. 08/096,998, now U.S. Pat. No. 5,322,481 is operated to provide a damping force to the flywheel by giving a pressure to the flywheel directly. This structure of damping device may cause the flywheel locked when an excessive pressure is given. As illustrated in FIG. 1, when the pressure is increased, the damping force curve rises sharply. Assume that point A is the lock point and point B is the critical point, thus the curve section between point A and point B indicates unsmoothed section. That is when the pressure from the damping force surpasses the critical point, the flywheel cannot be moved smoothly, and the exerciser will feel difficult to pedal the pedals. Why there is a critical point in the operation of the flywheel? That is because the legs cannot even apply force to the pedals while pedaling. As shown in FIG. 2, during the forward stroke of the first leg to move the first pedal from point C to point D, it is more difficult to apply force to the first pedal; during the down stroke of the first leg to move the first pedal from point D to point E, it is more easy to apply force to the first pedal; during the backward stroke of the first leg to move the first pedal from point E to point F, the second leg proceeds to the forward stroke to move the second pedal in performing the forward stroke from point C to point D; during up stroke of the first leg to move the first pedal from point F to point C again, the second leg proceeds to the down stroke to move the second pedal in performing the down stroke from point D to point E. Therefore, during the operation of the rotary gymnastic apparatus, the exerciser must stop exercising and adjust the pressure of the rotary gymnastic apparatus when the pressure of the damping device surpasses the moving force of the flywheel. However, everybody has different physical conditions, the critical point B will change when the rotary gymnastic apparatus is operated by different persons. Therefore, this structure of rotary gymnastic apparatus does not fit all persons. Furthermore, the adjustment of the damping device must ensure that the damping force does not surpass the critical point or reaches the lock point.

SUMMARY OF THE INVENTION

The present invention has been accomplished to provide a damping device for a rotary gymnastic apparatus which eliminates the aforesaid problems. This object is achieved by providing a curved channel plate having a bottom end pivotally disposed around the peripheral flange of the flywheel and linking the bottom end of the curved channel to a spring-supported hook at one end of a rotary knob-controlled traction device, and two friction pads bilaterally fastened inside the curved channel plate and controlled by the traction device to touch the peripheral flange of the flywheel in giving a damping force to the flywheel.

DETAILED DESCRIPTION OF THE PREFERRED EMBODIMENT

Figure 1:
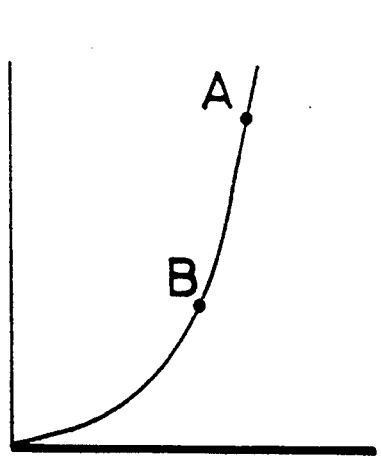
FIG. 1 is a damping force curve relative to the contact area according to the prior art.
Figure 2:
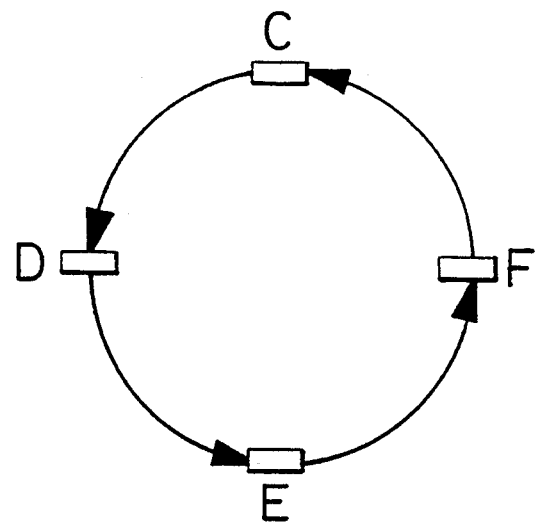
FIG. 2 shows the pedaling of the pedals of a regular rotary gymnastic apparatus through one cycle.
Figure 3:
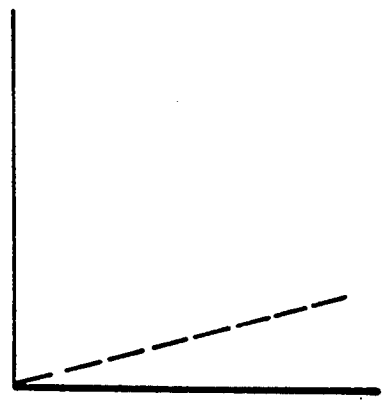
FIG. 3 is a damping force curve relative to the contact area according to the present invention.
Figure 4:
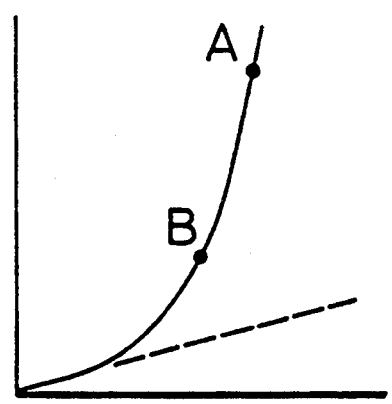
FIG. 4 is a comparison chart between FIG. 2 and FIG. 3.
Figure 5:
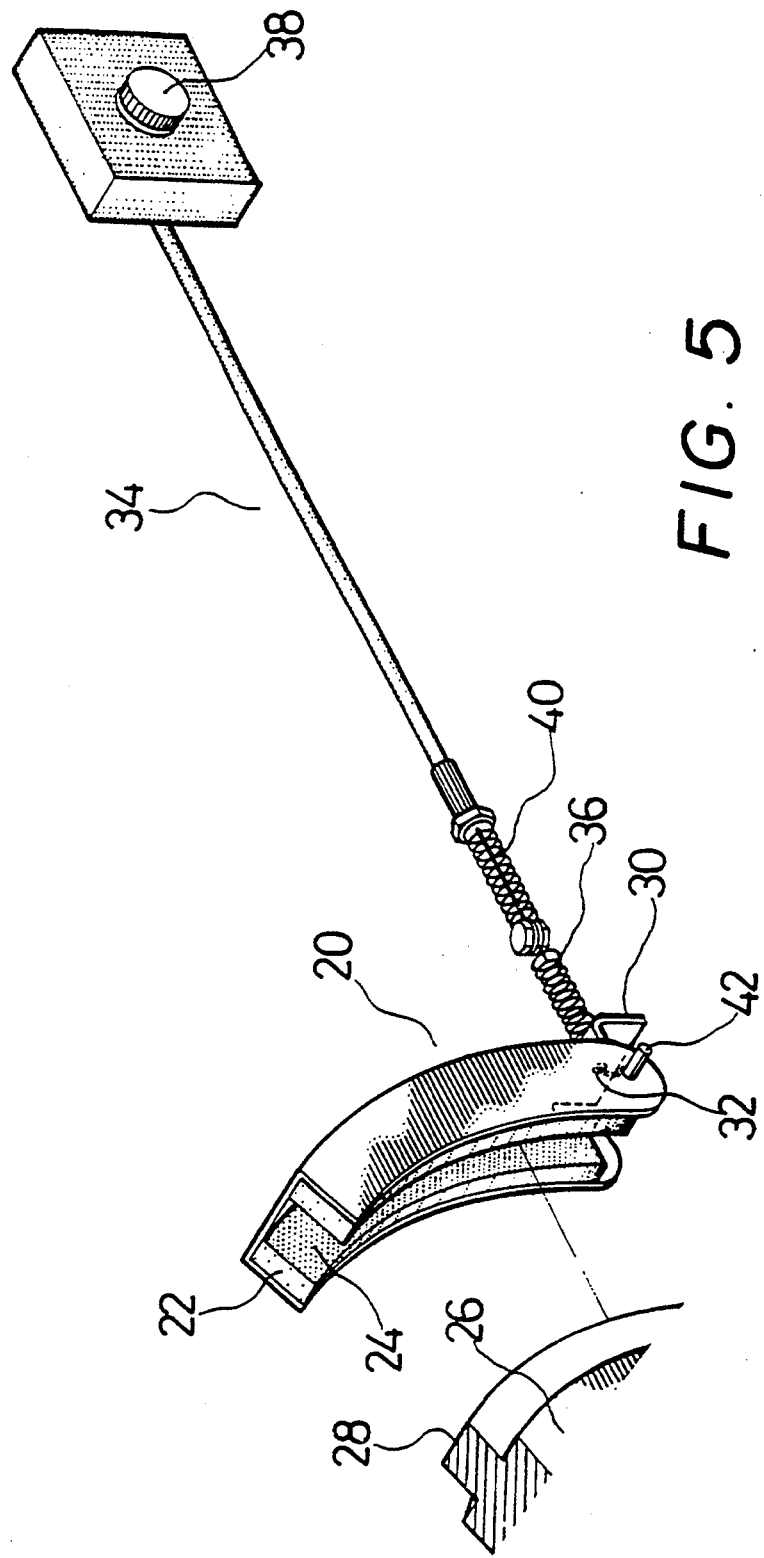
FIG. 5 is an elevational view of a damping device for gymnastic apparatus according to the preferred embodiment of the present invention.
Figure 6:
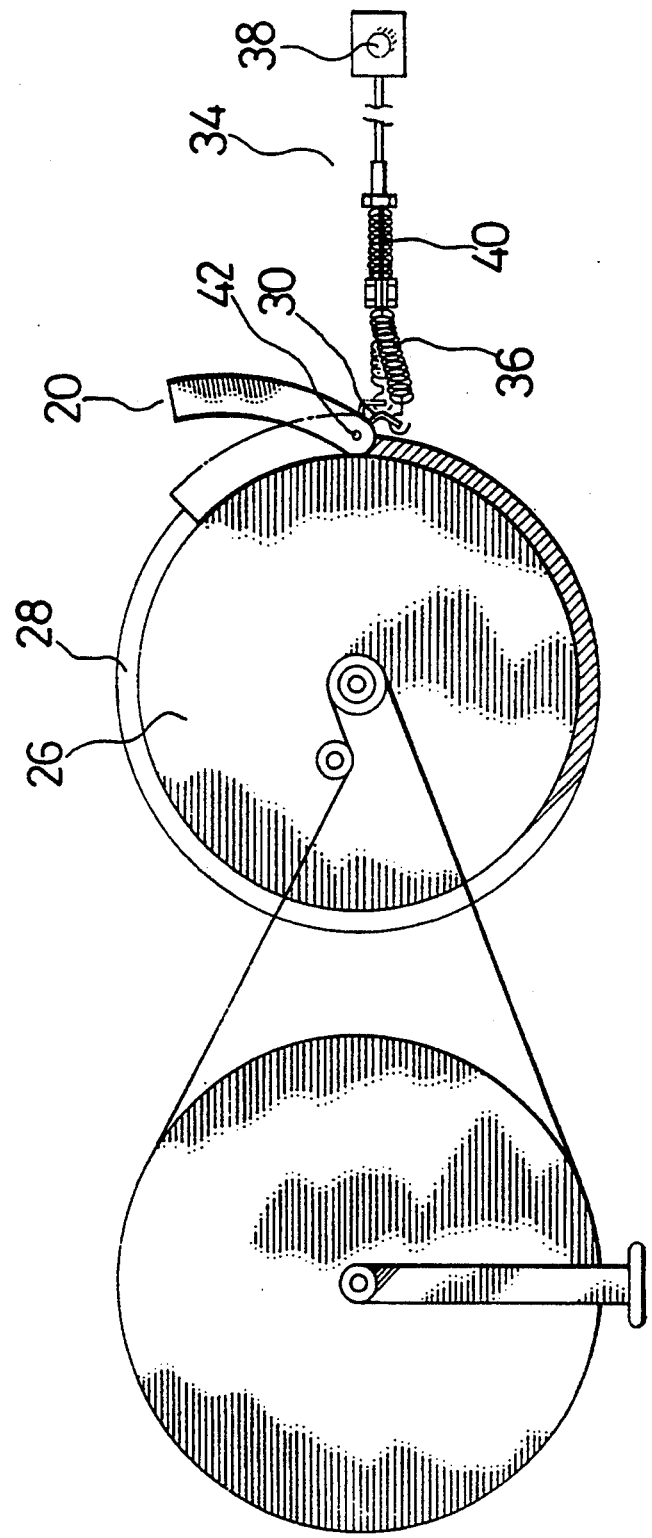
FIG. 6 is an installed view of the damping device shown in FIG. 5.

Referring to FIGS. 5 and 6, a damping device in accordance with the preferred embodiment of the present invention is generally comprised of a curved channel plate 20 having two friction pads 22 respectively made of felt and bilaterally disposed on the inside in the longitudinal direction and spaced by a longitudinal opening 24, which fits over the peripheral flange 28 of the flywheel 26 of the gymnastic apparatus (for example: stationary bicycle). A lug 30 is made on the curved channel plate 20 on the outside at the bottom, having a through hole 32. There is provided a traction device 34 comprised of a cable 40 having one end fastened to a rotary know 38 and an opposite end terminating in a spring-supported hook 36 hooked in the through hole 32 on the lug 30. The curved channel plate 20 further comprises two pivot pins 32 bilaterally aligned at the bottom near the lug 30 and respectively fitted into a respective pivot hole (not shown) on a respective wheel guard being disposed at either side by the peripheral flange 28 of the flywheel 26. When installed, the curved channel plate 20 is pivotally connected between the two opposite wheel guards of the flywheel 26 permitting the lower part of the friction pads 22 to contact the peripheral flange 28 of the flywheel 26. The length of the cable 40 and the turning angle of the rotary knob 38 are properly confined so that the maximum damping force of the damping device is controlled within a suitable range and does not lock the flywheel 26.

Referring to FIG. 6 again, under normal condition, only the bottom end of the curved channel plate 20 (the friction pads 22) is maintained in contact with the peripheral flange 28 of the flywheel 26. By turning the rotary knob 38 to pull the cable 40, the curved channel plate 22 is turned on the axis through the pivot pins 42 and moved toward the flywheel 26, causing the contact area between the peripheral flange 28 and the friction pads 22 increased, and therefore the damping force can be conveniently adjusted. Because traction device 34 is fastened to the lug 30 by the spring-supported hook 36, minor displacement of the lug 30 does not affect the operation of the traction device 34.

What is claimed is:

1. A damping device controlled by a rotary knob through a traction device to give a damping force to a gymnastic apparatus of the type comprising a free wheel and a flywheel driven by said free wheel through a belt transmission mechanism, the damping device comprising a curved channel plate having a bottom end pivotally connected between two wheel guards being disposed at two opposite sides by a peripheral flange around the periphery of said flywheel, two friction pads bilaterally fastened to said curved channel plate on the inside, a longitudinal opening defined between said friction pads, which receives said peripheral flange of said flywheel, a lug affixed to said curved channel plate on the outside near the bottom end and driven by said traction device through a spring-supported hook to adjust the angular position of said curved channel plate in changing the contact area between said peripheral flange of said flywheel and said friction pads.

* * * * *